F. SKERL.
MULTIPLE CASH REGISTER.
APPLICATION FILED AUG. 21, 1911.

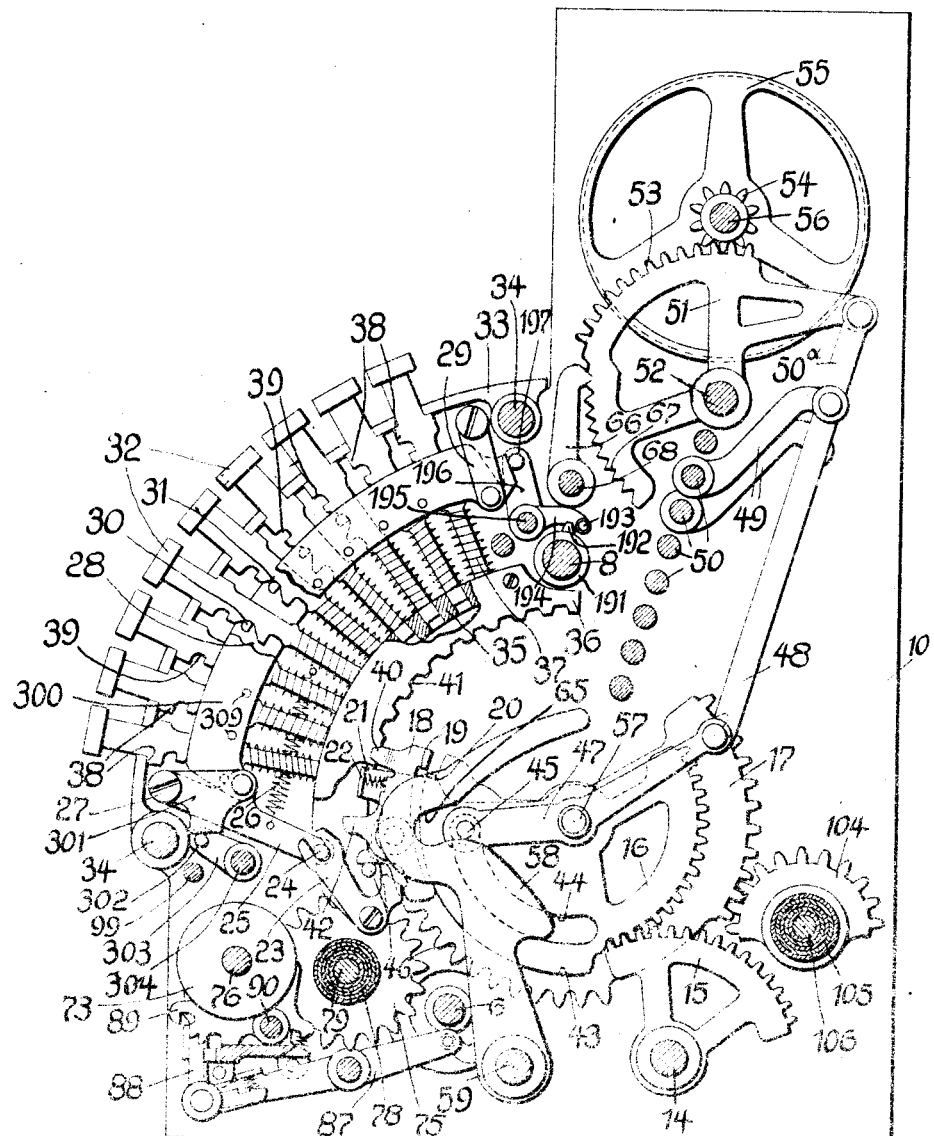

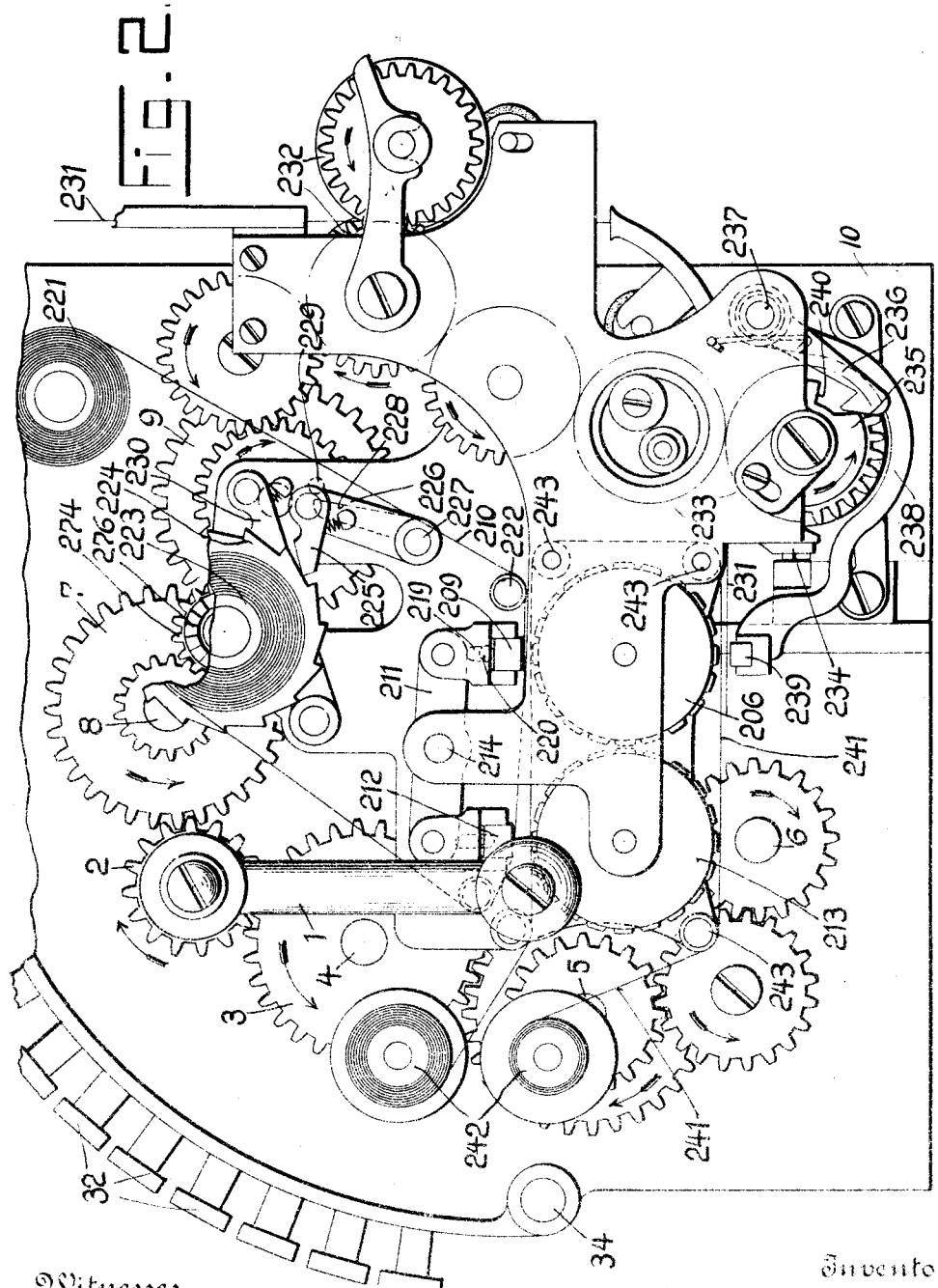

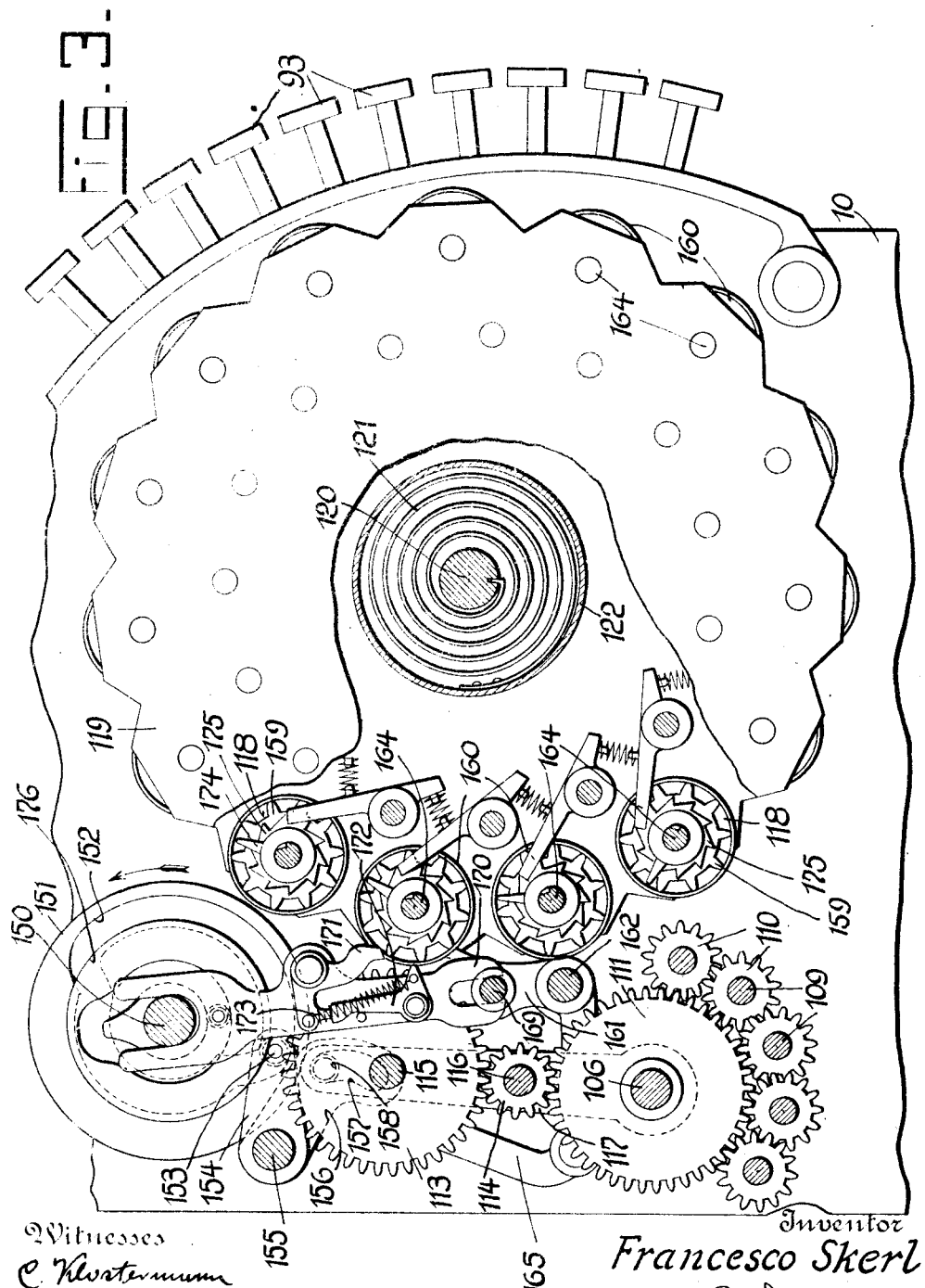

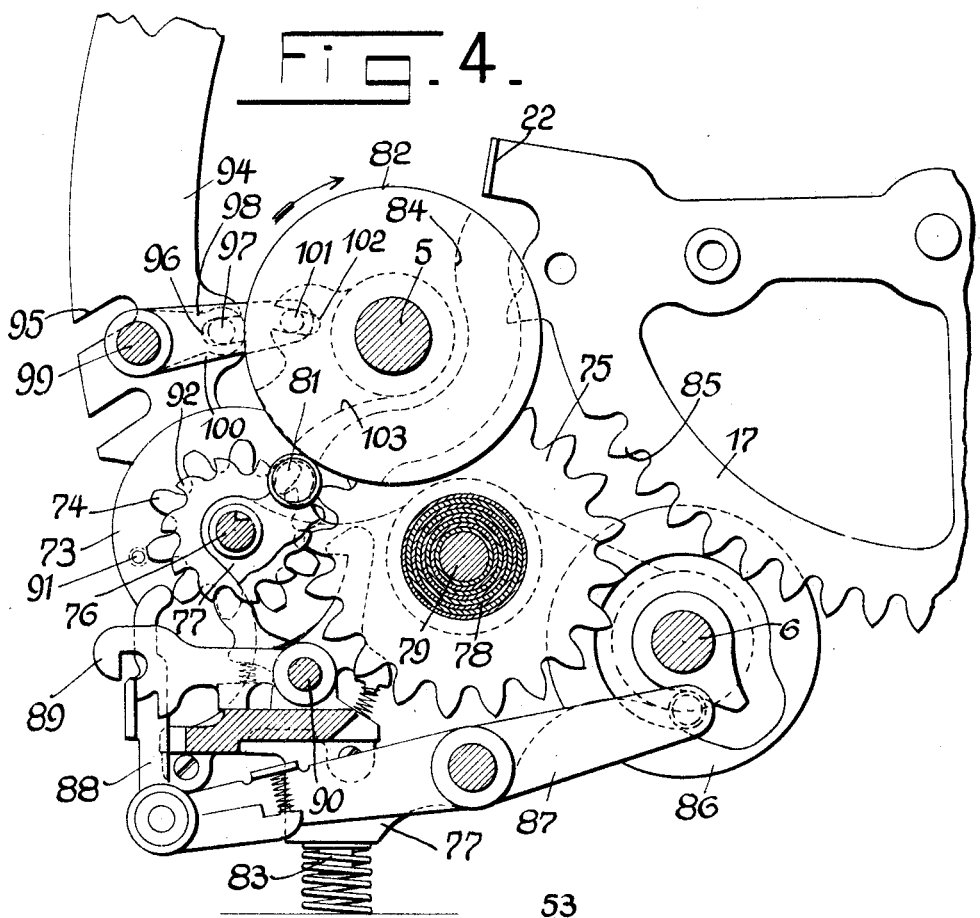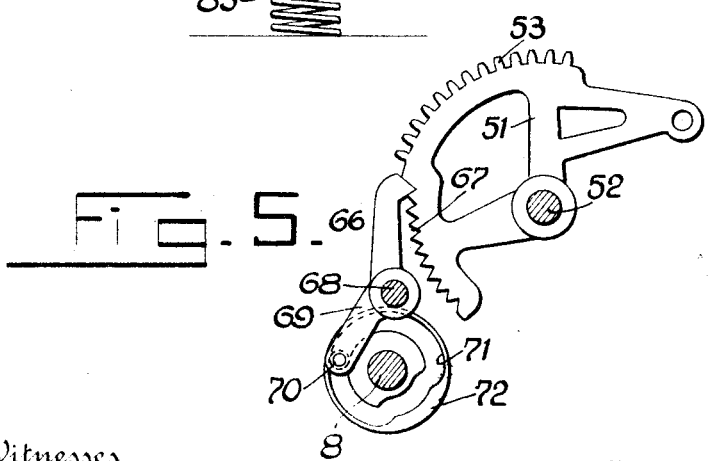

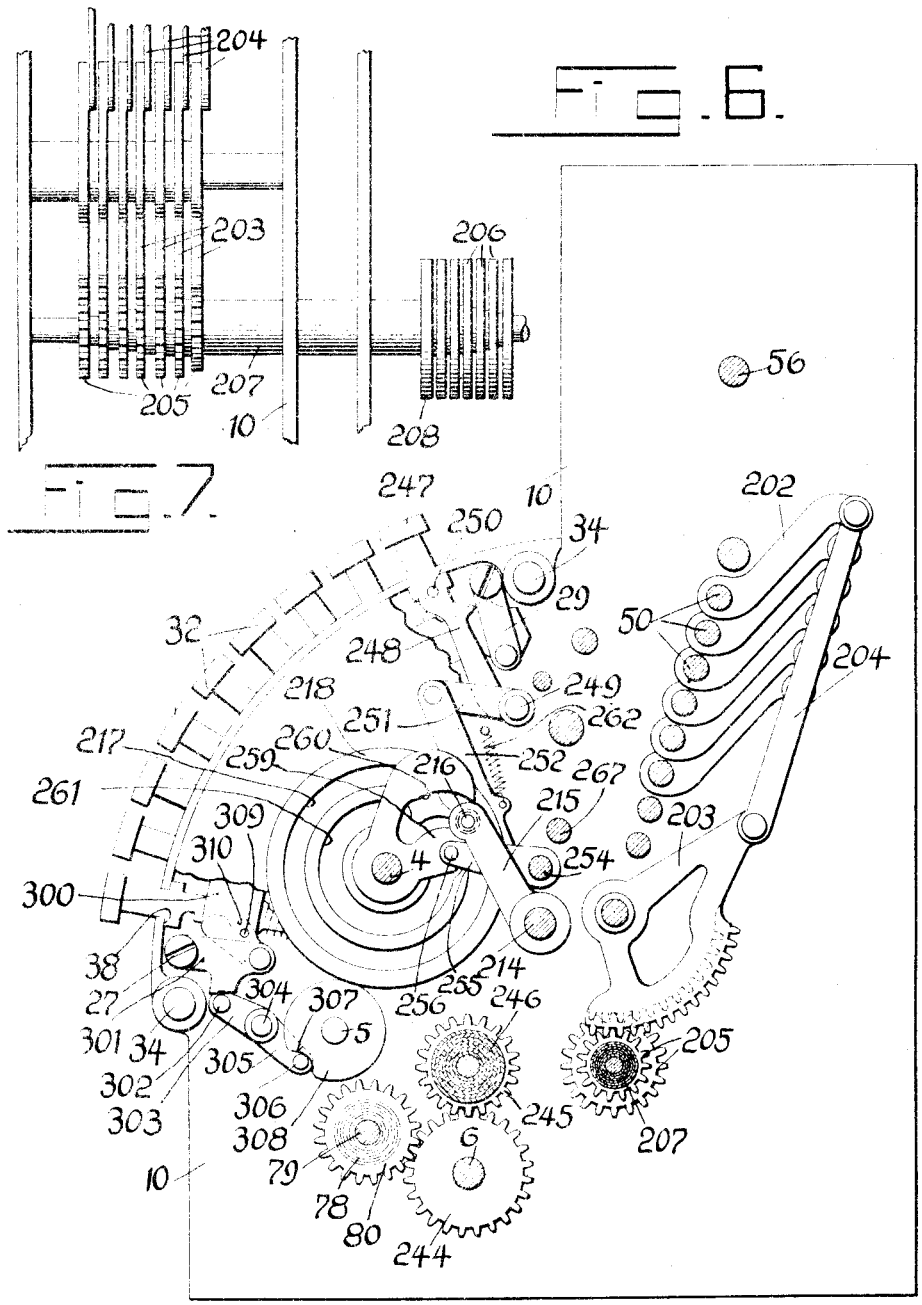

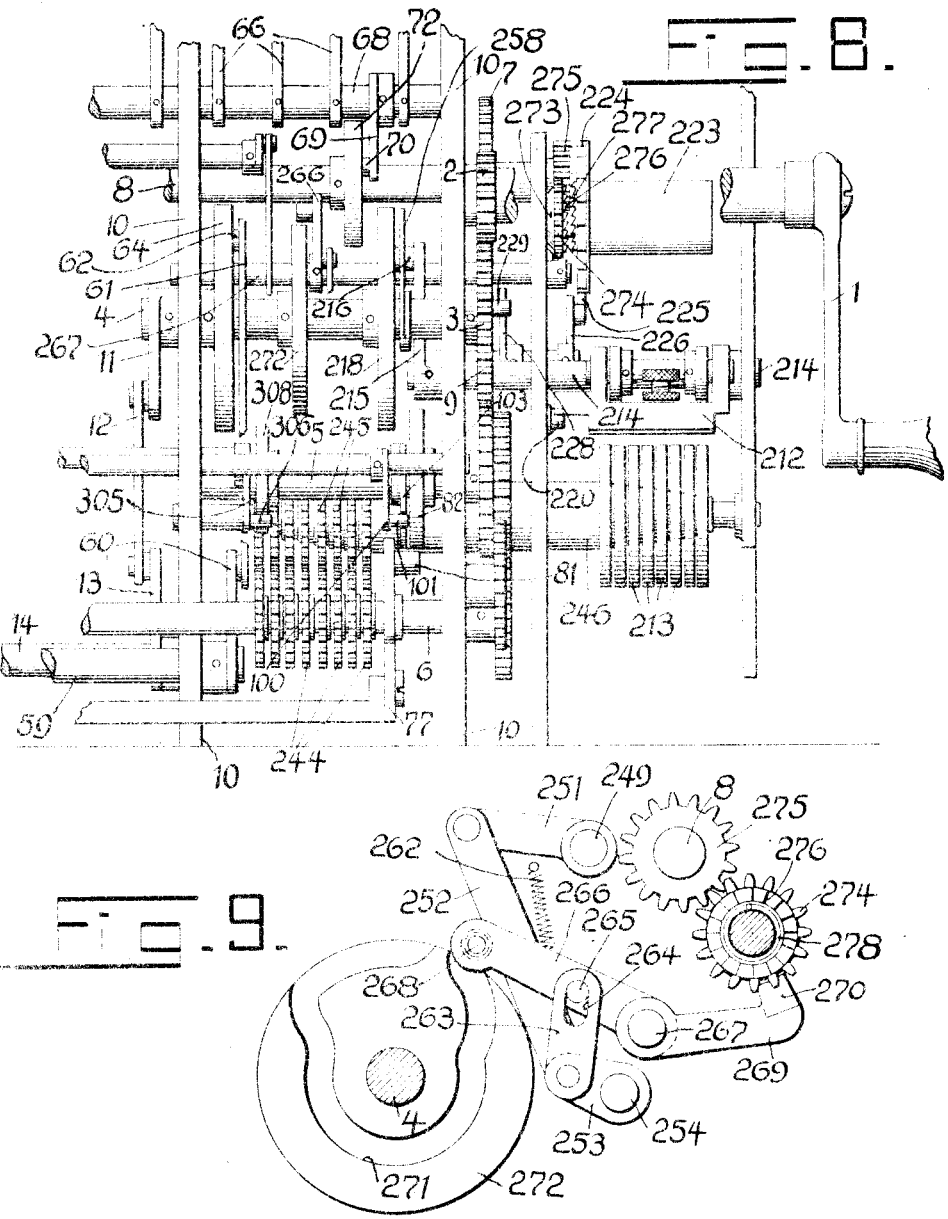

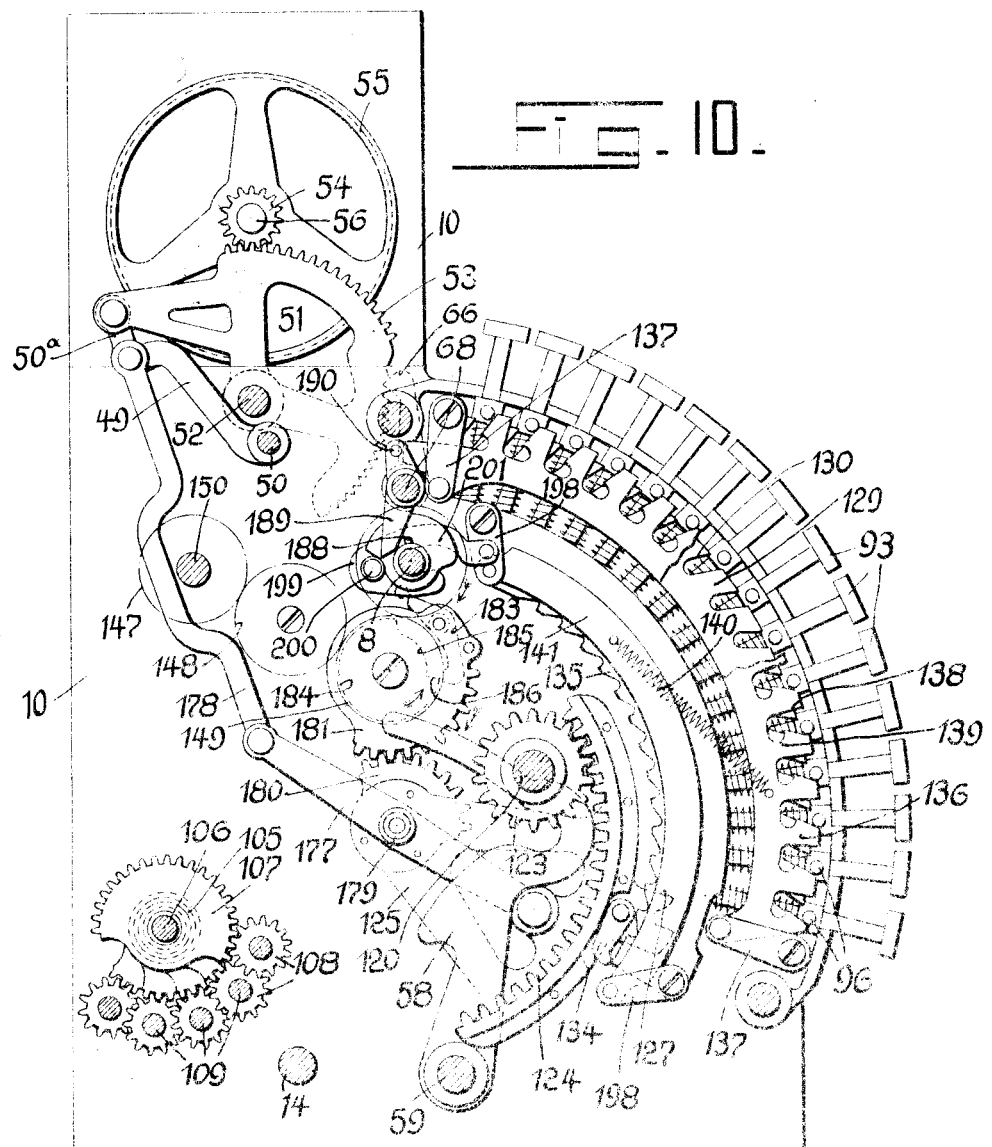

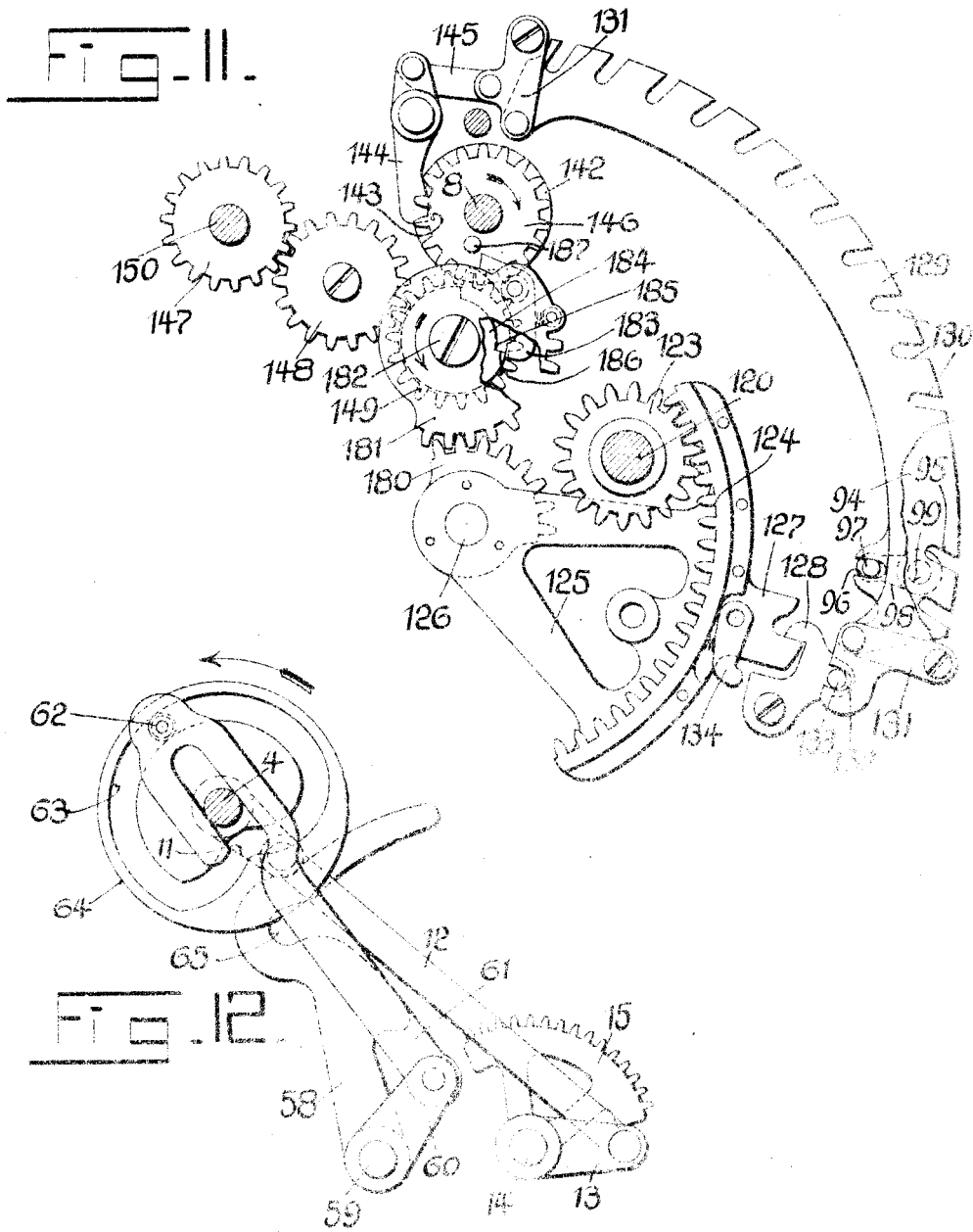

1,183,045. Patented May 16, 1916.
9 SHEETS—SHEET 9.

Witnesses
C. Klostermann
W. M. McCarthy

Inventor
Francesco Skerl
by R. C. Glass
Attorney

UNITED STATES PATENT OFFICE.

FRANCESCO SKERL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,183,045.

Specification of Letters Patent.

Patented May 16, 1916.

Application filed August 21, 1911. Serial No. 645,279.

*To all whom it may concern:*

Be it known that I, FRANCESCO SKERL, a citizen of Austria, residing at Dayton, in the county of Montgomery and State of Ohio, have invented certain new and useful Improvements in Multiple Cash-Registers, of which I declare the following to be a full, clear, and exact description.

This invention relates to accounting machines and more particularly to that type of machine employing a plurality of accumulators.

One of the main objects of this invention is to provide a frame with a plurality of accumulators, which frame may be moved to bring any of the accumulators into position to be operated by a set of actuators, which is common to all of the accumulators.

Another object of this invention is to provide an improved form of recording mechanism for listing items entered upon the machine and the total of said items.

A further object of this invention is to provide an improved form of a reciprocatory differential mechanism which is positively operated in both directions.

Another object of this invention is to provide an improved form of mechanism for preventing operation of the grand accumulator by the differential mechanism.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 13:
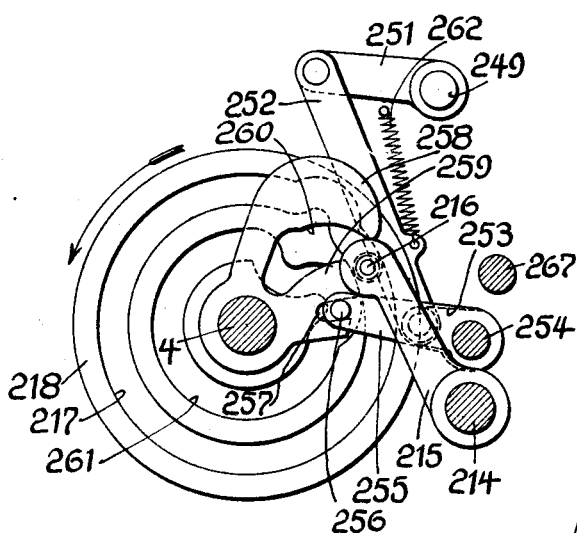
Figure 14:
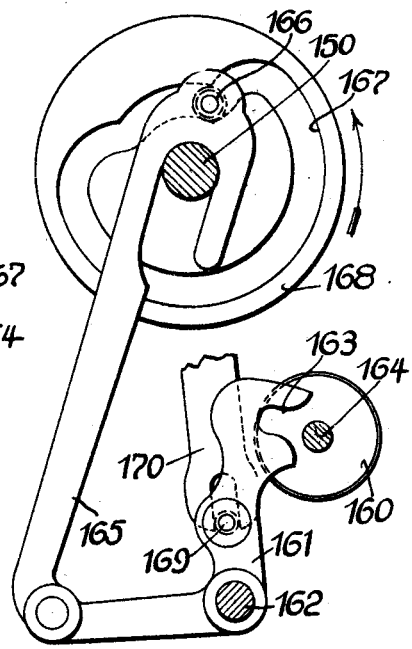
Figure 15:
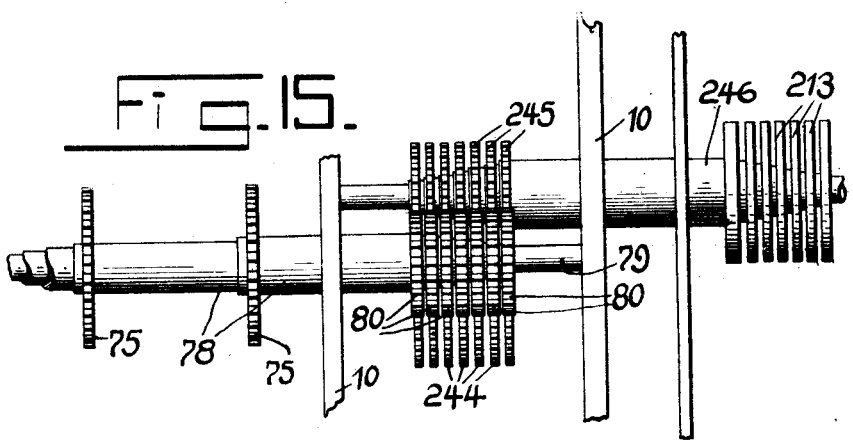

Figure 1 is a central transverse sectional view through the improved machine. Fig. 2 is an end elevation partly broken away showing the printing mechanism. Fig. 3 is an end elevation partly broken away looking in the opposite direction from that shown in Fig. 2 and showing the frame carrying the plurality of accumulators. Fig. 4 is an enlarged sectional view of the grand accumulator, also showing the mechanism for preventing engagement of the accumulator and the actuators therefor. Fig. 5 is a detail view of the alining devices for the indicator mechanism. Fig. 6 is a transverse sectional view taken between the machine proper and the recording mechanism, this view showing the total key and connections controlled thereby. Fig. 7 is a front elevation of the setting mechanism for the item listing type carriers. Fig. 8 is a partial front elevation of the recording mechanism. Fig. 9 is a detail view of the clutch and its operating mechanism for feeding the record strip when a total is recorded. Fig. 10 is a transverse sectional view of the machine taken along side of the department keys and showing the mechanism for differentially adjusting the movable frame carrying the accumulator. Fig. 11 is an enlarged view of part of the mechanism shown in Fig. 10 for positioning the accumulator frame. Fig. 12 is a detail view of part of the operating mechanism. Fig. 13 is a detail view of the cams for operating the platens for taking an impression from the item and total type carriers. Fig. 14 is a detail view of the alining mechanism for the accumulator frame. Fig. 15 is a front elevation of the connections between the intermediate gears of the grand accumulator and the total type carriers.

This invention as shown includes a series of amount banks of keys and a bank of special or department keys, which keys control differential mechanism that determines the position of indicators for displaying characters indicative of the amount represented by the keys depressed and the department or clerk making the sale. This differential mechanism is also connected with actuators for operating any one of a plurality of accumulators, which are carried by a movable frame, the accumulator with which the actuators engage being determined by the special key depressed. The machine is also provided with a grand accumulator which is actuated by the differential mechanism for the purpose of accumulating the grand total of all but a few of the independent accumulators. These independent accumulators of amounts not added upon the grand accumulator are for the purpose of taking care of special transactions, such as "charge" and "paid out". A recording mechanism is also provided, which is equipped with independent sets of type carriers for recording the items entered in the machine and also the total thereof, the total type carriers being connected to the elements of the grand accumulator, while the item type carriers are connected to the differential mechanism heretofore mentioned. The machine normally is so constructed as to list the items upon the record strip and also to issue a check. When it is desired to record the total, a total manipulative device is operated which controls mechanism for disabling the item listing devices and enabling the total recording mechanism. As an incident to the total recording operation, additional feed devices for the record strip are brought into play so that said strip will be given an additional length of feed in order to bring the last recorded item above the total, this being necessary on account of the total type carriers being located in front of the item type carriers. With this general understanding of the functions to be performed by this invention, the mechanism for performing these various functions will now be described in detail.

The machine is shown as being manually operated but at the outset it is desired to state that any of the power operating devices well known in the art to which the invention relates may be applied.

Referring to Fig. 2, it will be seen that the machine is provided with an operating crank 1 which has secured thereto a pinion 2. This pinion, through suitable intervening gearing 3, rotates shafts 4, 5 and 6 in the direction of the arrows shown in said figure. The pinion 2 secured to the crank handle 1 also meshes with a gear 7 secured to a shaft 8, which gear, through suitable intervening gearing 9, rotates rollers for feeding a check strip to the item type carriers, as hereinafter described.

The shaft 4, as seen in Fig. 8, is only a short shaft and is supported by two of the machine frames 10 located at the right hand side of the machine. At its inner end this shaft has secured thereto an arm 11 which is connected to one end of a link 12, the other end of said link being connected to an arm 13 secured to a transverse shaft 14 which is suitably supported by the frame work of the machine. Intervening gearing 3 connected to the operating handle 1 is so proportioned that for every two rotations of said handle the shaft 4 revolves once, and as this latter shaft is revolved the shaft 14 (Figs. 8 and 12) will be given an oscillatory movement by the link 12 connecting the arms 11 and 13 which respectively are secured to the shafts 4 and 14.

Secured to the shaft 14 and spaced thereon in accordance with the location of the amount banks of keys are a plurality of segments 15 which mesh with segments 16 pivotally mounted upon the machine frames 10, of which there is one for each bank of keys. From this description it will appear that the segments 15 and 16, which are the driving elements of the machine, are given an invariable movement at each complete operation of the crank handle 1.

Pivotally mounted upon the frames 10, at the same point as segments 16 are mounted, are driven members which are in the form of segmental plates 17. Each of these driven members 17, there being one for each bank of amount keys, has mounted thereon a centrally pivoted pawl 18 with a shoulder 19, which is arranged to coöperate with a companion shoulder 20 formed upon the driving segment 16, as plainly shown in Fig. 1 of the drawings. The shoulder 19 of the pawl 18 is normally so forced as to engage with the shoulder 20 of the driving segment 16 by a light coil spring 21 interposed between the forward edge of the pawl 18 and an offset 22 of the driven segment 17, but this pawl is normally restrained by one arm of a bell crank 23 which engages with the forward edge of the depending arm of the pawl 18. This bell crank 23 is held in the position shown in Fig. 1 by a pin 24 projecting from an arm 25, which is held in the position shown in said figure by a coil spring 26, which is of sufficient strength to overcome the tension of the spring 21. The arm 25, which is pivoted to one of the frames 10 as at 27, is connected to the lower end of a detent plate 28, the upper end of said plate being connected to an arm 29 which is also pivoted to one of the frames 10. This plate 28 is provided with lugs 30 which normally rest in cut out portions 31 of manipulative devices 32, which devices are in the form of keys. These keys are constructed so as to have a radial movement and are guided at their outer end by plates 33 supported by cross rods 34 which in turn are supported by the machine frames 10. At their inner ends the keys pass through guide plates 35 and are held from lateral displacement by a plate 36 suitably secured to the guide plate 35. These keys at their inner ends are reduced and springs 37 surround said reduced portions and normally hold the keys in their outermost positions, the said keys being limited in their outward movement by shoulders 38 formed thereon coming into contact with the underside of the guide plate 33. Each of the keys 32 is provided with a second cut out portion 39 which is not of as great a depth as the first mentioned cut out portion 31. When a key is depressed the inclined side of the cut out portion 31 of said key will contact with the stud projecting from the detent plate 28 and lower said plate, by which means the bell crank 23 will be rocked in an anti-clockwise direction (Fig. 1) through the pin 24 carried by the arm 25. This movement of the bell crank 23 will permit the pawl 18 to rock in a clockwise direction due to its spring 21, so that a shoulder 19 formed on said pawl will engage with the shoulder 20 of the driving segment 16. When the key is fully depressed the second cut out portion 39 formed therein will permit the detent 28 to return toward normal position, but, as previously stated, the depth of the second cut out portion 39 is not as great as that of the cut out portion 31, so it will be seen that the detent will not be fully returned to its normal position as if it were, the bell crank 23 could also be returned to normal position, by which movement it would rock the shoulder 19 of the pawl 18 out of engagement with the shoulder 20 of the driving segment, but this key being constructed as above described prevents any possibility of this occurring. This rocking movement of the pawl 18 upon the depressing of a key 32 will withdraw a forward projection 40 of said pawl out of one of the locking notches 41 formed on the underside of the previously mentioned plate 36 so that the pawl 18 will now be free to move with the driving segment 16. Upon the movement of said segment through the means hereinbefore described, the pawl 18 and the driven member 17, upon which it is mounted, will be carried with said segment.

Each of the pawls 18 is provided with a second forward projection 42 which is arranged to contact with the inner end of the depressed key during the movement of the pawl by the driving segment. As said projection 42 contacts with the depressed key the pawl 18 will be rocked in a counter clockwise direction against the tension of its spring 21 and thereby withdraw the shoulder 19 from engagement with the shoulder 20 of the driving segment. This counter clockwise movement of the pawl will carry the first mentioned projection 40 into one of the locking notches 41 and thereby prevent any overthrow movement of the driven member 17 to which said pawl is connected, the said pawl being held in this position. Upon the further movement of the driving segment 16 a locking surface 43 formed upon said segment will engage with the under side of the shoulder 19 of the pawl 18 and thereby prevent withdrawal of the projection 40 out of the notch 41.

The driving segment 16 is provided with an elongated slot 44 through which a stud 45 extending from the driven member 17 projects. Upon the return movement of the driving member or segment 16 to its normal position near the end of the operation of the machine, the upper end of the slot 44 will contact with the stud 45 and return the driven member or segment 17 with the pawl 18 to its normal position. As the upper end of the slot 44 contacts with the stud 45 previous to the return of the segment 17, the shoulder 20 of the driving segment will then be in position to permit the shoulder 19 of the pawl 18 to pass thereover and thereby allow the withdrawal of the projection 40 from the locking notch 41 with which it is in engagement. A stud 46 projecting from the frame 10 limits the return movement of the driven member or segment 17.

In order to prevent the operation of any of the keys of the amount banks after the operation of the machine is begun, a plate 300 is supported adjacent to each bank of keys by links 301, which links are pivoted to the frames 10 upon the same studs which hold the links supporting the detent plate 28. The lower one of each of the links 301 has a depending portion with which a pin 302 contacts, this pin projecting from an arm 303 extending from a transverse rock shaft 304 (Figs. 1 and 6), it being understood that there is one of these arms 303 having a pin 302 for each bank of amount keys. Extending rearwardly from the right hand end of the rock shaft 304 (Fig. 6) is an arm 305, which, at its rearward end, has projecting therefrom a pin 306 that normally rests in the cut away portion 307 of a disk 308 which is secured to the shaft 5. Upon the beginning of the rotation of the crank handle 1 the shaft 5 will be rotated also and through the cut away portion 307 of the disk 308 engaging with the pin 306, rock the shaft 304 in a clockwise direction, by which movement the forwardly extending arms 303 carrying the pins 302 will be rocked in a similar direction, so that the said pins, by engaging with the links 301, will elevate the plates 300 of the different amount banks. Each of these plates 300 is provided with pins 309, which, when the plates are elevated, will pass beneath shoulders 310 formed on the amount keys 32 and thereby prevent the depressing of said keys. At the end of the operation of the machine the pin 306 of the arm 305 will pass into the notch 307 of the disk 308 and the plates 300 returned to normal position so that said keys will then be free to be operated.

*Indicators.*—The indicator mechanism about to be described is of the type wherein the indicators are moved directly from one position to another without returning to a normal starting point.

Secured to the stud 45 of each of the driven members or segments 17 is one end of an arm 47, the free end of which is connected to a link 48, which link is secured to an arm 49 secured to one of a series of transverse shafts 50. Suitably secured to the arm 49 and extending upwardly therefrom is a small link 50ᵃ which is connected at its upper end to a segment 51 loosely mounted upon a transverse shaft 52. This segment 51 is provided with teeth 53, which mesh with a pinion 54 secured to the side of an indicator 55, which is mounted upon a transverse shaft 56. Arms similar to the arms 49 project rearwardly from the shafts 50 and are connected to segments similar to the segment 51, by links 50ª, these segments being used for adjusting the indicators that are arranged to display a transaction at the rear of the machine, while the indicators 55 are arranged to indicate at the front of the machine. The shafts 50 also position the item type carriers as hereinafter described.

Projecting from each one of the arms 47, in horizontal alinement with the pivotal point of the driving and driven members, is a roller 57, which is arranged to be engaged by a hook-shaped arm 58 and thereby move the said arm 47, and, through the connections previously mentioned, position the indicator 55 to display a character indicative of the extent of movement imparted to the driven member 17. These arms 58, of which there is one adjacent to each arm 47, are mounted fast upon a transverse shaft 59 (Figs. 1, 8 and 12), which shaft at its right hand end has projecting upwardly therefrom an arm 60, to which is connected the lower end of a pitman 61, the upper end of said pitman being provided with a roller 62, which plays in a cam groove 63 formed in a disk 64 secured to the previously described shaft 4. The pitman 61 is hook-shaped at its upper end and straddles the shaft 4 so as to be guided by said shaft during the reciprocation of said pitman. The shape of the cam groove 63 is such that after the driven members 17 have been positioned, and previous to their return movement, the shaft 59 will be rocked. During this rocking of the shaft 59 the hook arms 58 will engage with the rollers 57 projecting from the arms 47 and move said arms with the studs 45 acting as the pivots for the arms. The rollers 57 projecting from the arms 47 are moved to a constant position at each operation of the machine by the hook arms 58 and the indicators 55, through the link connections previously described, thereby receiving different extents of movement depending upon the position of the studs 45. If the driven members 17 are given the same degree of movement at successive operations thereof, the studs 45 will be moved to the same place with the connecting point between the arms 47 and links 48 acting as pivotal points for the said arms 47, so that when the hook arms 58 are rocked, the rollers 57 will pass into the crotches of the arms 58 without being affected by said arms, thus enabling a display of similar amounts successively without any movement of the indicators. Immediately after the indicators have been positioned, alining pawls 66 engage with notches 67 formed in the indicator actuating segments 51 and lock said segments and indicators in their adjusted positions. These alining pawls extend upwardly from a transverse shaft 68 which is provided with a downwardly extending arm 69 (Fig. 5) that has projecting therefrom a roller 70, which plays in a cam slot 71 formed in a disk 72 secured to the main operating shaft 8. The shape of the cam groove 71 is such that the pawls 66 are withdrawn from the alining notches 67 during the operation of the hook arms 58, which arms, as previously described, are used for adjusting the indicators 55.

Beneath the banks of keys 32 there is located the grand accumulator upon which is accumulated all items listed with the exception of special transactions such as "charge" and "paid out". When these special transactions are entered in the machine the accumulator is held out of engagement with the driven members during the operation of the latter so that the amount may be indicated and recorded without being accumulated. The grand accumulator comprises a plurality of movable elements 73 in the form of numeral wheels, which wheels have secured to the sides thereof pinions 74, which pinions in turn mesh with gear wheels 75. The accumulator wheels 73 are loosely mounted upon a shaft 76 which is supported by side arms of a frame 77, the latter being pivotally mounted upon the operating shaft 6. The intermediate wheels 75 are connected to the inner ends of nested sleeves 78 (Fig. 4), which sleeves surround a shaft 79 and extend toward the right hand side of the machine and have secured at their outer ends pinions 80 (Fig. 6) which are connected to total type carriers as hereinafter described. These intermediate gears 75 and pinions 80 with their connecting sleeves 78 and shaft 79 are carried by the side arms of the pivot frame 77. Projecting from one of the side arms of the frame 77 (see Fig. 4) is a roller 81 which normally rests upon the surface of a disk 82 secured to the shaft 5. Stout coil springs 83 are interposed between the base of the machine and the lower edges of the side arms of the frame 77, which springs force the roller into contact with the surface of the disk 82. Upon the beginning of the rotation of the crank handle the shaft 5 will be rotated in the direction of the arrow (Fig. 4) and upon the first movement of said shaft a cam groove 84 formed in the disk 82 will present itself to the roller 81, which will relieve the tension of the springs 83, the latter then rocking the frame 77 in a clockwise direction about the shaft 6, by which movement the roller 81 passes into the cam groove 84 of the disk 82. As said disk 82 continues to rotate, the frame 77 will be further lifted so as to carry the intermediate gears 75 into mesh with teeth 85 formed upon the driven or differentially movable elements 17. After the intermediate gears are engaged with the teeth 85 of the actuating segments 17, the said segments will then be moved as heretofore described and thereby actuate the elements 73 of the grand accumulator. After the amount has been accumulated, the frame 77 will be rocked back into the position shown in Fig. 4 by the cam groove 84 of the disk 82, the roller 81 passing out of the groove 84 and on to the surface of said disk.

Cam disks 86 are secured to the shaft 6 and operate levers 87, which carry at their forward ends transfer pawls 88, these pawls being normally held out of operative position by trip pawls 89, which are suitably mounted upon a shaft 90 supported by the side arms of the frame 77. Pins 91 project from the accumulator elements 73 and are arranged to trip the pawls 89 as the elements 73 make a complete rotation, so as to permit the transfer pawls 88 to engage with ratchet wheels 92 of higher denomination, after which said transfer pawls are actuated by the cam disks 86. This style of transfer is well known and it is thought no further description need be given of same.

As previously stated, when special transactions, such as "charge" and "paid out," are to be entered in the machine, mechanism is provided for preventing the operation of the grand accumulator. As seen in Fig. 10, fifteen special or department keys are located in the lefthand bank, which keys control the positioning of a movable frame, which frame carries individual accumulators, one for each key. In the present instance the lowermost keys have been designated "Charge" and "Paid out" and when either of these keys is operated the grand accumulator is held out of engagement with the differential elements or actuators 17.

Located on the right-hand side of the keys 93 of the special bank is a plate 94 having inclined slots 95 (Fig. 4) with which key pins 96 of the two lowermost keys of the special key bank engage. On its rearward edge and near its lower end the plate 94 is provided with a notch 96 (Figs. 4 and 11), into which projects a pin 97 extending from an arm 98 secured to a rock shaft 99. This shaft 99 extends to the right across the machine and near its right-hand end has secured thereto a rearwardly extending arm 100, which has a pin 101 projecting therefrom. This pin enters a notch 102 formed in a plate 103 loosely pivoted upon the shaft 5 adjacent to the disk 82. From this it will be seen that when one of these two lowermost keys is depressed the plate 94 will be lowered, and, through the intermediate connections heretofore described, the plate 103 will be rocked in an anti-clockwise direction (Fig. 4), which movement will carry the plate 103 adjacent to the opening of the cam groove 84 in the disk 82. When the disk 82 is rotated with the plate 103 in this position, it will be seen that said plate 103 will prevent the passage of the roller 81 into the cam groove 84 so that as the disk 82 continues its rotation the roller will bear upon the surface of said disk without entering the groove 84 thereby preventing the engagement of the intermediate gears 75 with the actuators 17. It is to be understood that the plate 94 may be provided with as many inclined slots as there are keys in the special bank, and to have such of the key pins 96 lengthened as are desired to engage the inclined slots 95 of the plate 94, and thus the grand accumulator be prevented from operating in connection with the entry of any desired class or classes of transactions.

As previously mentioned, a movable frame is provided, which has mounted thereon independent accumulators for keeping separate account of different classes of transactions, or the receipts of different clerks, or different departments of a store. In the present instance the frame carrying the individual accumulators is rotatable and is controlled by a bank of special keys, of which there are fifteen shown. When any one of the special keys is depressed a motor spring will be released, which will rotate the frame carrying the accumulators until the desired accumulator represented by the key depressed is brought into coöperative relation with a set of actuators common to all of said accumulators. These actuators are connected to the differentially movable elements previously described, and after the desired accumulator is brought into position to be engaged by said actuators, the latter are moved into engagement therewith and then rotated to actuate the positioned accumulator an extent determined by the amount keys depressed.

The driven or differentially movable elements 17 (Fig. 1) mesh with segments 104, which are fastened to the inner end of nested sleeves 105 that surround a shaft 106. These sleeves extend toward the left and at their outer ends are provided with segments 107 (Fig. 10) similar to the segments 104. These segments 107 mesh with pinions 108 secured to the ends of short shafts 109. These shafts 109 (Fig. 3) carry pinions 110 similar to the pinions 108, which pinions mesh with gears 111 loosely mounted upon a shaft 106. The movement of the gears 111 is conveyed to actuating gears 113 through intermediate pinions 114. The gears 111 and pinions 114 are supported upon rods 115 and 116 respectively, which rods are mounted in the side arms of a frame 117. This frame 117 is arranged to be rocked so as to carry the actuating gears 113 into mesh with the positioned accumulator, as hereinafter more fully described. The purpose of the pinions 108 and 110 and the shafts 109 is to bring the actuating gears in their proper denominational order, as if the nested sleeves 105 were connected directly through the segments 107 to the actuating gears 113 without the intervention of the pinions 108 and 110, it will be seen that the actuating gear of the units denomination would be on the extreme outer end, whereas it should be the inner one of the actuating gears.

As previously stated, the special keys 93 control the positioning of independent accumulators 118 which accumulators are mounted in a rotary frame 119. This frame 119 is mounted upon a rod 120 which is suitably supported by frames 10 of the machine, and is located at the left-hand side of said machine. One end of a stout coiled spring 121 is secured to the rod 120, while the other end of said spring is secured to a cylindrical shell 122 connecting the side plates of the drum or frame 119. Attached to the right-hand plate of the drum 119 is a gear 123 (Figs. 10 and 11) which meshes with teeth of a segmental rack plate 124, which rack plate is secured to a segmental plate 125, which in turn is pivotally mounted as at 126 to one of the frames 10 of the machine. The plate 125 is provided with a forward extension 127 with which a latching pawl 128 normally engages to prevent the movement of said plate 125 by the spring 121. To the left of the special keys 93 is a segmental plate 129 which is provided with inclined slots 130 (Figs. 10 and 11) with which the pins 96 of the special keys 93 coact. This plate 129 is supported at its upper and lower ends by links 131, which are pivotally mounted upon one of the frames 10. When any of the special keys 93 is depressed its key pin 96 will enter one of the inclined slots 130 and lower the plate 129. By the lowering of this plate 129 the links 131 (Fig. 11) will be rocked in an anti-clockwise direction. The lower link 131 is provided with a notch 132 into which plays a pin 133 projecting from the latch pawl 128. From this it will be seen that when the lower link 131 is rocked in an anti-clockwise direction by the depression of one of the keys, the pawl 128 will be rocked out of engagement with the projection 127 so as to free the plate 125 carrying said projection. The moment this plate 125 is freed the spring 121 will start to rotate the drum 119 carrying the individual accumulators and will continue to rotate said drum until the projection 127 comes in contact with the inner end of the depressed special key.

In order to prevent rebound of the drum 119 when the projection 127 contacts with one of the keys, the said projection carries a spring-operated pawl 134 which ratchets over a plate 135 secured to the frame 10 adjacent the special key bank. From this it will be seen all danger of rebound is prevented, as the pawl 134 engages with one of the teeth of the plate 135 when the projection 127 contacts with the depressed key.

The special keys are held in their depressed position by a detent plate 136 which is supported by links 137 pivoted to the frame 10 at the same point as the previously described links 131. This plate 136 is provided with slots 138 having locking notches 139. A spring 140 connected to the detent plate 136 and a plate 141 draws the detent plate in position to latch the depressed key.

While the drum or frame 119 is revolving in bringing the desired accumulator into position to be engaged by the actuators, any suitable locking mechanism controlled by the frame may be provided to prevent the operation of any one of the rotary shafts connected to the operating handle 1. These interlocking devices between movable parts of the machine being well known in the art, it is thought no further description or illustration thereof is necessary, as they form no part of the present invention.

The shaft 8, which is revolved once during each operation of the machine, is normally prevented from operation and is only released upon the operation of one of the special keys. This shaft 8 (see Fig. 11) extends through the machine and has secured, near its left-hand end, a disk 142 equipped with a locking notch 143. A downwardly extending member of a centrally pivoted pawl 144 normally rests in the notch 143, while the upper member of said pawl is connected by a link 145 to one of the swinging arms 131 which support the plate 129. This plate, as previously described, is moved downwardly upon the operation of one of the special keys and the supporting arms 131 are rocked in an anti-clockwise direction, by which movement the locking arm 144, through the link 145, is rocked in a clockwise direction thereby withdrawing the downwardly extending member of the arm 144 out of the notch 143 so as to leave the shaft 8 free to be rotated. Adjacent to this locking disk 142 is a gear 146 which drives a gear 147 through intermediate gears 148 and 149. The gear 147 is secured to a shaft 150 which is supported in the frames 10, which also support the drum 119.

After the desired individual accumulator 118 has been positioned relative to the actuators 113, the frame 117 carrying said actuators 113, will be rocked upon the beginning of the operation of the crank handle 1. The first movement of the crank handle 1, will, through the shaft 8 and intermediate gearing, start to rotate the shaft 150 (Fig. 11). This shaft 150 carries a disk 151 (Fig.

3) which is provided with a cam groove 152. A roller 153 projecting from an arm 154 plays in this cam groove 152 and this arm 154 is secured to a rock shaft 155 suitably supported by the frames 10. Fast to and extending forwardly from this rock shaft 155 is an arm 156, which, at its forward end, is provided with a cam slot 157 into which extends a roller 158 projecting from one of the side arms of the frame 117 carrying the actuating gears 113. At the very beginning of the rotation of the shaft 150 the cam groove 152 will rock the arm in an anticlockwise direction, and, through shaft 155, the arm 156 will be rocked in a similar direction. This movement of the arm 156 will, through the cam slot 157, rock the frame 117 so as to carry the actuating gears into engagement with pinions 159 of the positioned accumulator, these pinions 159 being secured to registering wheels or elements 160 of the accumulators. After the actuating gears have been moved in engagement with the pinions 159 of the individual accumulator, they receive the same degree of movement imparted to the driven or differentially movable elements 17, through the connections heretofore described.

To insure the proper meshing of the actuating gears 113 and the pinions 159, an alining device is provided which insures the proper positioning of the adjusted accumulator. This alining mechanism is shown in Fig. 14 and comprises a bell crank lever 161 pivoted upon a rod 162. The vertical arm of the bell crank 161 is provided with a flaring notch 163, which notch, upon the very beginning of the operation of the crank handle, passes over one end of the shaft 164 supporting the accumulator elements or wheels 160 of the positioned individual accumulator and thereby corrects any misalinement due to wear, etc. This bell crank is operated by a pitman 165, one end of which is connected to the horizontal arm of the bell crank 161, while the other end is provided with a roller 166 that plays in a cam slot 167 formed in a disk 168 secured to the shaft 150. An arm similar to the vertical member of the bell crank 161 extends up from the other end of the shaft 162 and engages with the shaft 164 of the positioned accumulator. These two arms 161 are connected by a cross rod 169 (Fig. 3), which cross rod extends through elongated slots formed in the lower ends of transfer slides 170. These slides are forked at the upper ends and straddle the shaft 150. Each of these slides 170 carries a transfer pawl 171 and a trip pawl 172 which are connected by a spring 173. In the position shown in Fig. 3, which is the position the transfer slides are held in when the machine is at rest, the transfer pawl and trip pawl of each slide are out of cooperative relation with the elements 160 of the individual accumulators so that said accumulators may be restored or returned to zero without affecting the transfer pawls. As the alining device is moved to aline the positioned accumulator, the lower ends of the transfer slides 170 will be rocked forwardly by the cross rod 169 which connects the arms 161 of the alining device so as to bring the trip pawls of the transfer slides into position to be engaged by the one-tooth disks 174 which are connected to the accumulator elements 160. When any of the said accumulator elements completes a rotation, with the transfer slide in the position just mentioned, its companion one-tooth disk 174 will trip the trip pawl 172 so that its companion carrying pawl 171 will engage with one of the teeth of the ratchet wheel 175 of the next higher element of the accumulator, and as the slide 170 carrying the transfer pawl 171 is reciprocated, it will move the next higher element 160 one unit. This movement of the next higher element by the transfer pawl 171 will cause the ratchet wheel 175 with which the pawl 171 is in engagement to rock said pawl back to its normal position to be relatched by the trip pawl 172. The slides 170, for which there is one for each element of the accumulator above the lowest denomination, are actuated by cam disks 176 secured to the shaft 150. These cam disks are mounted spirally about the shaft 150 so as to operate the slides 170 successively. This type of transfer mechanism is well known in the art and it is thought no further description of same need be given.

The segmental plate 125 (Fig. 10) has connected thereto one end of an arm 177, the other end of said arm being connected by a link 178 to an arm similar to the arms 49 shown in Fig. 1, which arm is connected with one of the transverse shafts 50. This shaft 50 carries another arm 49, which, at its free end, is connected to the segment 51, for operating the indicator 55 for displaying the special characters, by one of the links 50ª.

The arm 177 has projecting from its center a roller 179, which roller is arranged to be engaged by one of the hook arms 58 fast to the rock shaft 59, after the segmental plate 125 has been adjusted by rotation of the drum 119, and thereby to position the special indicator by the connections just described in a similar manner as the amount indicators shown in Fig. 1 are positioned, which has been previously described in detail.

After the positioned accumulator has been actuated by the actuators 113 and also after the special indicator 55 has been positioned, the frame 119 carrying the individual accumulators 118 is returned to its normal position by the following mechanism: The segmental plate 125 (Fig. 11) has pinned thereto a segmental rack plate 180, the teeth of which mesh with a similar rack plate 181 which is mounted upon one of the frames 10 by a stud 182, upon which stud is also mounted the intermediate gear 149. The rack plate 181 carries a spring pressed pawl 183 which rides upon the surface of a restoring disk 184, which is fastened to the intermediate gear 149. By reference to Fig. 11 it will be seen that when the segmental plate 125 is moved counter clockwise upon being released by depression one of the special keys, the rack plate 180 will turn the rack plate 181 in a clockwise direction, the pawl 183 carried by the plate 181 riding around the surface of the restoring disk 184. As the operating handle 1 is turned, the shaft 8 will be rotated in the direction of the arrow shown in Fig. 11, and will, through the gear 146, rotate the gear 149 and the restoring disk 184 in the direction of the arrow shown on said disk. This disk 184 is provided with a cut out portion 185 into which the pawl 183 will spring after the positioned accumulator has been actuated by the gears 113. A shoulder 186 formed by the cut away portion 185 of the disk 184 will engage with the pawl 183 and return said pawl and plate 181, to which it is connected, to its normal position as shown in Fig. 11. This movement of the plate 181, will, through segmental plate 180 secured to the plate 125, restore the latter plate also to its normal position, which movement will be conveyed to the accumulator frame 119 through the gear 123 and rack plate 124, the latter being carried by the segmental plate 125. The accumulator frame will be turned slightly beyond its normal position to insure the engagement of the latch pawl 128 with the projection 127 of the segmental plate 125, after which a pin 187 projecting from the gear 146 will contact with the tail of the pawl 183 and rock said pawl out of engagement with the shoulder 186 so that the projection 127 may return into contact with the hook of the latch pawl 128 by means of the drum spring 121 and connections. This return movement of the projection 127 into contact with the pawl 128 will permit a slight movement of the restoring pawl 183, which movement permits the tail of said pawl to pass from engagement with the pin 187 and the head of said pawl to rest upon the surface of the restoring disk 184 as shown in Fig. 11. Just previous to the withdrawal of the pawl 183 from engagement with the shoulder 186 a pin 188 (Fig. 10), suitably fastened to the shaft 8, will engage with a downwardly extending member of a centrally pivoted arm 189 and rock said arm in a clockwise direction so that a pin 190, projecting from the upper end of said arm, will contact with the rear edge of the latching detent 136 for the special key bank and move said detent to release the depressed key. Simultaneously with the release of the special key the amount keys are released as follows: Secured to the shaft 8 (Fig. 1) is a disk 191 having a tooth 192 which engages with a roller 193 projecting from an arm 194 secured to a transverse shaft 195 and rocks said arm and shaft in a counter clockwise direction. Projecting upwardly from the shaft 195 are a plurality of arms 196, one for each amount bank of keys. At the upper end these arms have projecting therefrom pins 197 which contact with the rear edge of the key detents 28 for the amount banks of keys 32.

Devices have been described for preventing the rebound of the accumulator frame when the said frame is moved to bring any one of the individual accumulators into cooperative relation with the actuating gears. It is obvious that previous to the return of the accumulator frame to its normal position by the mechanism just described, it is necessary to disable these devices which prevent the rebounding of the accumulator frame when said frame is positioned. This disabling means is as follows: Adjacent to the ratchet plate 135 (Fig. 10) with which the pawl 134 coöperates as the segmental plate 125 is moved in the positioning of the accumulator frame, is the plate 141, which is supported by links 198, which are pivotally mounted upon one of the frames 10. Connected to the upper one of the links 198 is the forward end of a pitman 199, the rearward end of which is forked so as to straddle the shaft 8. This pitman has projecting therefrom a roller 200 which coöperates with a cam 201 secured to the shaft 8. The timing of this cam 201 is such that immediately after the positioned accumulator has been actuated, and previous to the return of the accumulator frame to its normal position, this cam will engage with the roller 200 and move the pitman 199 rearwardly, which movement will rock the links 198 in a clockwise direction thereby moving the plate 141 rearwardly. The pawl 134 is of sufficient width so that when said plate 141 is moved rearwardly it will contact with said pawl, and rock said pawl out of engagement with the notched plate 135 so that the segmental plate 125 will then be free to be returned to its normal position, as previously described. This pawl 134 is held out of engagement with the ratchet plate 135 until said plate has been returned to its normal position, after which the roller 200 projecting from the pitman 199 passes off of the high portion of cam 201 so as to permit the disabling plate 141 to be returned to its normal position by the spring 140, which, as previously described, connects the plate 141 with the detent plate 136 for the special key blank.

This invention also includes a recording mechanism for listing items upon a record strip as they are entered in the machine and also for issuing a check strip. This mechanism is also constructed so as to record the total whenever desired. In the specific construction shown there are employed two sets of type wheels, one for listing the items upon the record strip and printing upon the check strip, while the other set of type carriers is employed for printing the total only. These total type carriers are located in front of the item type carriers, and as the record strip is fed forwardly it is necessary to provide a special feed mechanism for giving the record strip an additional length of feed in order to bring the last recorded item above the total whenever the total is recorded. This special feed mechanism is actuated by the operating mechanism whenever it is desired to record the total. In some instances this extra feed of the record strip when a total is recorded might be used as a means for distinguishing a total from the items, and some of the claims covering this feed of the record strip are intended not to be limited to independent sets of type carriers but to be broad enough to cover machines employing a single set of type carriers from which both the item and the total are recorded.

A novel form of impression mechanism has been devised whereby a single lever may be operated in opposite directions for the purpose of recording items and the total thereof.

As described in connection with the indicator setting mechanism (Fig. 1), there are employed a plurality of transverse shafts 50 which are suitably connected to the driven differential members 17. These shafts extend toward the right of the machine and near their outer end (Fig. 6) have arms 202 connected thereto, which arms are connected to segmental racks 203 by links 204. These segmental racks 203 mesh with pinions 205 which are connected to the item type carriers 206 (Fig. 7) by nested sleeves 207. A special type carrier 208 is connected to one of the pinions 205 by a suitable sleeve and owing to the fact that there are fifteen keys in the special bank, while there are but nine in the amount banks, it is necessary to reduce the size of the pinion 205 and enlarge the radius of the segment 203 coöperating therewith, so as to bring the proper character into position to print in alinement with the amount type carriers 206. From this description it will be seen that the type carriers 206 and 208 are connected to the indicators 55 and move therewith, it being recalled that the indicators are moved directly from one position to another without returning to their normal starting point, consequently the type carriers will receive the same degree of movement as the indicators. After the type carriers 206 and 208 have been properly adjusted, a platen 209 is carried into contact therewith to take an impression from said type carriers upon a record strip 210. This platen 209 is mounted upon the rear end of a centrally pivoted lever 211 (Fig. 2), which lever carries at its forward end another platen 212 for taking an impression from the total type carriers 213 as hereinafter described. The platen carrying lever 211 at approximately its center is secured to a rock shaft 214, which shaft is suitably supported in the frame work of the machine. This shaft, near its left-hand end (Figs. 6 and 13), has an upwardly extending arm 215, which, at its upper end, is provided with a roller 216 that extends into a cam groove 217 formed in a disk 218 secured to the shaft 4. With the roller 216 playing in the groove 217, it will be seen by reference to Figs. 6 and 13 that the arm 215 is rocked near the end of the rotation of the disk 218, first in a clockwise direction and then back to its normal position. This rocking of the arm, will, through the shaft 214, rock the lever 211 (Fig. 2) in a similar direction, by which movement the platen 209 will be carried into contact with the type carriers 206 and 208 to take an impression upon the record strip 210. This platen 209 is pivotally mounted upon the lever 211 and in order to guide the platen in its vertical movement it is provided with an elongated recess 219 in which projects a pin 220 extending from the printer frame.

The record strip 210 is led from a supply roll 221 around guide pins 222 to a storage roll 223. This storage roll 223 is suitably mounted upon the printer frame and has attached thereto a ratchet wheel 224. A feed pawl 225 engages with the teeth of the ratchet and moves said ratchet one space at each operation of the machine. This pawl is carried at the upper end of an arm 226, which arm is secured at its lower end to a stub shaft 227 suitably mounted in the printer frame. This shaft at its other end carries an upwardly extending arm 228, which, at the beginning of the operation of the machine, is engaged by a pin 229 projecting from one of the intervening gears 9 (Figs. 2 and 8) so that the shaft 227 carrying the arm 226 upon which the feed pawl is mounted, is rocked in a counter clockwise direction, by which movement the feed pawl 225 will engage the ratchet 224 and feed said ratchet one step thereby feeding the record strip to the storage roll 223. The shaft 227 is returned to its normal position, as shown in Fig. 2, after the pin 229 passes out of engagement with the arm 228 by a suitable spring not shown. A retaining pawl 230 engages the ratchet 224 and prevents retrograde movement of said ratchet and storage roll.

A check strip 231 is fed by a double set of rolls 232 and 233 to the under side of the type carriers 206 and 208, it being understood that these type carriers are provided with duplicate sets of type for printing upon the record strip 210 and upon the check strip 231, the above mentioned feed rollers being rotated by the intervening gearing 9 as shown partially in full lines and partially by pitch lines in Fig. 2 of the drawings. A frame carrying a knife 234 is reciprocated by a suitable cam connected to the lower roll of the set 233 as is well known in the art, the knife being for the purpose of severing the strip 231 into checks. A disk 235 is connected to the lower one of the set of rollers 233 and with this disk a spring operated arm 236 coöperates. This arm is secured to a stub shaft 237, which shaft also carries a forwardly extending arm 238 on which at its forward end, is mounted a platen 239 for taking impressions from the type carriers 206 and 208 upon the check strip 231. The disk 235 is provided with a cut away portion 240 into which the arm 236 springs near the end of the rotation of the cam 235 to permit the platen 239 to take an impression from the type carriers. At the end of rotation of the disk 235 an inclined wall of the cut away portion 240 will cam the arm 236 rearwardly so as to carry the platen 239 away from the type carriers.

A ribbon 241 carried by spools 242 passes around the item and total type carriers, the said ribbon being suitably guided by rolls 243. No feeding device for the ribbon has been shown as any of the well known feeding devices may be employed, which devices as is well known are constructed so that the direction of the feed of the ribbon is automatically reversed.

The total type carriers, as previously stated, are mounted in front of the item type carriers and are positively connected to the grand accumulator so that these type carriers will be positioned at all times to print the amount shown by the elements of the grand accumulator.

The intermediate gears 75 of the grand accumulator, as shown in Figs. 1, 4, and 15 are connected to the inner ends of nested sleeves 78, which sleeves, at their outer ends, carry pinions 80 (Fig. 6), as previously described. These pinions 80 mesh with pinions 244 which are loosely mounted upon the operating shaft 6, these latter pinions in turn meshing with pinions 245 (Fig. 8), which are connected to the inner ends of nested sleeves 246. These sleeves 246 extend toward the right and at their ends have secured thereto the total type carriers 213. By these connections it will be seen that the total type carriers 213 will be positioned so as to bring the type carrier to the printing point corresponding to the characters displayed by the accumulator elements 73 at their reading point.

As previously stated, the lever 211 (Fig. 2) carries a platen 212 for taking an impression from the total type carriers 213, but this platen is normally inoperative and in order to render it operative, the following mechanism is provided: Adjacent to the right-hand bank of amount keys is located a total manipulative device 247 (Fig. 6) which is arranged to be latched in a depressed position similarly to the amount keys. Adjacent to this total manipulative device or key 247 is an arm 248, which is secured to a rock shaft 249 suitably secured within the machine frame. A pin 250 projecting from the total key 247, when said key is depressed contacts with the inclined upper edge of the arm 248 and rocks said arm and shaft 249 in an anti-clockwise direction (Fig. 6). Secured to and projecting forwardly from the shaft 249 is an arm 251, which, at its forward end, is connected with the upper end of a link 252, the lower end of the latter being connected to an arm 253 which is secured to a rock shaft 254 (Fig. 9). Secured to and projecting forward from the shaft 254 is an arm 255 (Fig. 13), which, at its forward end, has projecting therefrom a pin 256 that extends into a notch 257 formed in a plate 258. From the above it will be seen that as the shaft 249 is rocked in an anti-clockwise direction upon the depression of the total key 247 the shaft 254, through the connection above described, will be rocked also in an anti-clockwise direction, which movement will rock the plate 258 about the shaft 4 in a clockwise direction. This plate is provided with a blocking prong 259 and a cam slot 260. When the plate 258 is rocked as just described, the blocking prong 259 will be moved out of the path of the roller 216 of the arm 215 so that said roller will then be free to move into a second cam groove 261 formed in the disk 218. As the plate 258 continues its rocking movement the cam slot 260 will positively cam the roller 216 into said cam groove 261. This movement of the arm 215 carrying the roller 216 will rock the shaft 214 slightly, but not enough to rock the lever 211 to carry the total platen 212 into contact with the total type carriers 213. The shape of the cam groove 261 is such that when the roller 216 plays therein, the shaft 214 upon which is the lever 211 carrying the platens 209 and 212, will be rocked in an opposite direction from that in which it is rocked when the roller 216 plays within the cam groove 217 of the disk 218. This rocking of the lever 211 will carry the total platen 212 against the type carriers to take an impression upon the record strip 210. The taking of an impression from the total type carriers occurs near the very end of the operation of the machine, and after the total key is released and restored to its normal position. The parts controlled by the total key for the total taking impression operation are returned to their normal positions by spring 262 which is connected to the link 252 and one of the frames 10 of the machine. As the lever 211 is rocked to carry the platen 212 against the total type carriers, the said platen is guided by a slot and pin construction similarly to the previously described item platen.

As previously mentioned, the record strip 210 is arranged to be fed an additional extent when the total is recorded so as to bring the last recorded item above the total impression and this additional feed of the record strip occurs as an incident to the recording of the total, and will now be described.

Upon the depressing of the total key 247, the shaft 254 (Fig. 9) will be rocked counter clockwise, as previously described. Connected to the arm 253 which is secured to the shaft 254 is a link 263, the upper end of which is provided with an elongated slot 264. A pin 265 extends from an arm 266 into the upper end of the slot 264 of the link 263. This arm 266 is secured to a rock shaft 267 and at its forward end is provided with a roller 268. Secured to the shaft 267 is a rearwardly extending arm 269, which, at its extreme rearward end is provided with a camming projection 270. From this it will be seen that when the shaft 254 is rocked upon the depressing of the total key 247, the shaft 267 will also be rocked in a similar direction. This rocking of the shaft 267 will carry the roller 268 projecting from the arm 266 into a cam groove 271 of a disk 272 secured to the shaft 1. Upon the rotation of said disk 272 the cam groove 271 will further rock the arm 266 in a counter clockwise direction, which movement of the arm will be conveyed through the shaft 267 to the rearwardly extending arm 269. As this latter arm is rocked in a counter clockwise direction, its camming projection 270 will engage with a bevel extension 273 (Fig. 8) of a pinion 274 and force said pinion to the right. This pinion 274 (Fig. 2) is constantly in mesh with a pinion 275 secured to the shaft 8, the latter pinion being of considerably greater width than the pinion 274, so that when said pinion 274 is shifted laterally it still remains in engagement with the pinion 275. The pinion 274 has laterally projecting ratchet or clutch teeth 275 (Fig. 8), which, when said pinion is shifted, as just described, will engage with similar teeth 277 projecting from the ratchet wheel 224. While the clutch teeth 276 and 277 are in engagement the continuous rotation of the pinion 275 will be imparted to the storage roll 223 through the pinion 274. Previous to the taking of an impression from the type carriers the roller 268, which plays in the cam groove 271 (Fig. 9), will be restored to its normal position so that the camming projection 270 of the arm 269 will be rocked out of engagement with the bevel projection 273 of the pinion 274, and as soon as this is done a coil spring 278, interposed between the clutch parts 276 and 278, will separate these parts and thus disconnect the pinion 274 from the storage roll 223. While the teeth 276 and 277 are connected the record strip 210 will be fed so as to bring the last record item above the position in which the total is recorded upon the record strip.

Having thus described the various parts that go to make up the complete invention, a résumé of the general operation of the machine will now be given so as to refresh the memory as to the operation and functions of the various parts.

The attendant depresses keys 32 representing the amount of sale and the special key 93 indicating the kind of transaction or the department in which the sale is made. The depressing of the special key 93 (Figs. 10 and 11) lowers the plate 129, which movement disengages the latch pawl 128 from the projection 127 of a segmental plate 125. Upon the withdrawal of the latch pawl 128 the coil spring 121 (Fig. 3) will rotate the drum 119 in an anti-clockwise direction and through the gear 123 (Figs. 10 and 11), which is secure to the drum 119, will rotate the segmental plate 125 in a similar direction about its pivotal point 126. The segmental plate 125 will be arrested by the projection 127 coming into contact with the inner end of the depressed key. This segmental plate being positively geared to the drum 119 will also arrest the latter with the individual accumulator 118 corresponding to the depressed special key in position to be engaged by the actuating gears 113. The depressing of each amount key 32 (Fig. 1) will lower its corresponding detent 28 and thereby rock the link 25 and bell crank 23 so as to permit the shoulder 19 of the pawl 18 to engage with the shoulder 20 of the driving member 16, it being understood that this engagement of the pawl 18 and the driving member 16 takes place in each amount bank in which a key is depressed. The lowering of the plate 129 (Fig. 11) by the depressing of a special key will, through link 145, rock pawl 144 in a clockwise direction so as to withdraw the lower end of said pawl out of the notch 143 of the locking disk 142 secured to the shaft 8 and thereby free the operating handle, it being understood that any of the interlocking devices between movable parts well known in this art, may be employed to prevent the operation of the shaft 8 carrying the locking disk 142 until the drum 119, which is also released by the operation of the special key, has been positioned to bring the selector accumulator into coöperative relation with the actuators. After the selected accumulator has been positioned, the operating handle 1 (Fig. 2) is then rotated, and, through the intervening gearing 3, rotates the shafts 4, 5 and 6, and, through the gear 7, rotates the shaft 8. The rotation of the shaft 4, will, through the arms 11 and 13 and link 12 (Figs. 8 and 12), impart a reciprocatory movement to the shaft 14. This movement of the shaft 14 (Fig. 1) through segments 15, of which there is one for each amount bank, will impart a reciprocatory movement to the driving members 16, which, through the pawls 18 of the operated amount banks, will carry the driven or differential members 17 an extent determined by the keys depressed, the projections 42 of the pawls 18 coming into contact with the inner ends of the depressed keys thereby disengaging shoulders 19 from the shoulders 20 of the driving members 16. The differential movement imparted to the driven member 17 will be conveyed to the actuating gears 113 (Fig. 3) by the segments 104 (Fig. 1), nested sleeves 105, segments 107 (Fig. 10), pinions 108 and shaft 109, and through pinions 110 (Fig. 3) to the gears 111 and thence to the actuating gears 113 through the intermediate pinion 114. Previous to the movement of the actuating gears 113 the frame 117 carrying said actuators will be rocked by the arm 156 having cam slots 157 formed in the end thereof, in which slot plays the roller 158 projecting from one of the side arms of the frame 117. The arm 156 is rocked by cam groove 152 formed in the disk 151 secured to shaft 150. Projecting into groove 152 is a roller 153 extending from the end of arm 154 which is secured to rock shaft 155, which rock shaft also carries the before mentioned arm 156. This rocking of the frame 117 will bring the actuating gears 113 into engagement with the pinions 159 of the selected individual accumulator 118 so that any rotary movement imparted to the actuating gears 113 will be conveyed to the accumulator 118. Immediately after the amount is registered upon the accumulator the frame 117 carrying the actuating gears is returned to normal position, as shown in Fig. 3. Previous to the movement of the driven members 17 the frame 77 (Fig. 4) carrying the grand accumulator elements 73 will be rocked by the roller 81 projecting from said frame passing into the cam groove 84 of the disk 82. This rocking of the accumulator frame will bring the intermediate gears 75 into engagement with the teeth 85 formed upon the driven members 17. While these intermediate gears are in engagement with the teeth 85 of the driven members 17 the latter will be differentially adjusted, as previously described, this differential movement being imparted to the grand accumulator elements 73 through the intermediate gears 75. If it is one of the special accumulators corresponding to one of the two lower special keys that is brought into operative relation with the actuating gears 113 (Fig. 3) the plate 103 (Fig. 4) will have been rocked into position to block the entrance of the roller 81 into the cam groove 84 of the disk 82. This movement of the plate 103 being brought about by the plate 94 which is actuated by the key pins of the two lowermost keys of the special bank, which key pins engage inclined slots 95 formed in the plate 94 and through the slot and pin connections 96 and 97 respectively, rock the arms 98 and 100, and through the pin 101 projecting from the arm 100, which plays in the slot 102, rock said plate 103. Upon the operation of the machine with the plate 103 in this position, it will readily be seen that the frame 77 carrying the grand accumulator elements 73 will be held in its lower position during the entire operation of the machine so that the differential movement imparted to the driven members 17 will not be conveyed to the accumulator elements 73.

Studs 45 (Fig. 1) mounted on the driven members and projecting through elongated slots 44 in the driving members 16 have pivoted thereto rearwardly extending arms 47, which arms are connected to a series of transverse shafts 50, through links 48 and arms 49 projecting rearwardly from said shaft. Links 50ª connect the arms 49 to segments 51, which segments mesh with pinions 54 secured to indicator drums 55. After the differentially driven members 17 have been positioned, hook arms 58 fastened to a rock shaft 59 will be moved in a clockwise direction (Fig. 1), which arms will engage with rollers 57 projecting centrally from the arms 47, and move said arms and rollers 57 until the latter rest in the crotches 65 of the hooked arms 58. This movement of the arms 47 will, through the links 48, arms 49, links 50ª and segments 51, position the indicator to display characters indicative of the amount represented by the keys depressed. Previous to the movement of the segments 51 alining pawls 66 will be rocked out of engagement with notches formed in said segments so that said segments may be moved to position the indicators. After the indicators have been properly adjusted, these pawls are returned to locking engagement, as shown in Fig. 5, by cam groove 71 formed in the disk 72 secured to the rotation shaft 8. After the indicators have been latched in their adjusted position, as just described, the shaft 14 (Fig. 1) is returned to its normal position, and, through the segments 15 secured to said shaft, return the driving members to their normal position. The return of these latter members to their normal position, will, by the upper ends of the elongated slots formed therein contacting with the studs 45, restore the driven members 17 to their normal position also, which movement will restore the actuating gears 113 to normal position through the connections previously described, the latter gears being previously disconnected from the pinions 159 of the selected individual accumulator. Previous to the restoration of the driven members 17, as above described, the hook arms 58 will have been restored to their normal positions by the cam disk 64 and connections shown in Fig. 12.

The shafts 50 extend toward the right of the machine and near the ends thereof have rearwardly extending arms 202 (Fig. 6) which are connected by links 204 to segments 203, these segments in turn meshing with pinions 205 which are connected by nested sleeves 207 with type carriers 206 for listing the individual amounts, and also to a special type carrier 208 for recording special characters corresponding to the special keys. An impression is taken from these type carriers by platen 209 (Fig. 2) which is carried by a centrally pivoted lever 211 at its rear end. This lever is secured to a rock shaft 214 which has projecting upwardly therefrom an arm 215 (Figs. 6 and 13), the said arm being provided with a roller 216 at its upper end which plays in a cam groove 217 formed in a disk 218 secured to the shaft 4. The shape of the groove 217 is such that the arm 215 and shaft 214 is rocked in a clockwise direction near the end of the operation of the machine, which rocking of the shaft 214 will carry the platen 209 into contact with the item and the special type carriers 206 and 208 to record upon the record strip 210.

A check strip 231 (Fig. 2) is fed between two sets of feed rollers 232 and 233 to the under side of the above mentioned type carriers and an impression is taken thereon from said type carriers by a platen 239, which is carried in the free end of a lever 238, which is secured to a rock shaft 237. This rock shaft has secured thereto an arm 237 which engages with a cam disk 235 secured to the lower one of a set of feed rollers 233. The arm carrying platen 238 is rocked in an anti-clockwise direction by the cam disk 235 engaging with the arm 236 and near the end of rotation of the disk 235 the arm 236 springs into a recess 240 formed in said disk 235 so as to permit the platen 239 to spring into contact with the under side of the item type carriers 206 and the special type carrier 208. A knife 234 is reciprocated by the lower roller of the set 233 during each operation thereof and said knife, as is well known, is used for the purpose of severing the strip 231 into checks, which checks are given to the customer as a receipt for the amount of purchase.

At the beginning of the rotation of the operating handle 1 pin 229 (Fig. 2) projecting from one of the gears 9, will contact with arm 228 and rock said arm in an anti-clockwise direction. This arm is secured to rock shaft 227 and said shaft at one end thereof has projecting upwardly therefrom an arm 226 which carries a feed pawl 225 for the record strip 210. As the shaft 227 is rocked by the pin 229, the pawl 225 will engage with a ratchet 224 and feed the record strip 210 which is stored upon a roller 223 to which the ratchet 224 is secured.

A set of total type carriers 213 are located in front of the item type carriers and whenever desired a record may be obtained from said total type carriers. These type carriers are connected by nested sleeves 246 (Figs. 6 and 15) to pinions 245, which pinions mesh with idlers 244 that are loosely mounted upon a rotation shaft 6. These idlers mesh with pinions 80 connected to the outer end of nested sleeves 78 (Figs. 1, 4, 6 and 15), which sleeves at their inner ends are secured to the intermediate gears 75 of the grand accumulator. By these connections between the total type carriers 213 and intermediate gears 75 of the grand accumulator, it will be seen that the total type carriers receive the same degree of movement as is imparted to the differential elements 73 of the grand accumulator so that the said type carriers are always in position to have printed therefrom the total as shown by the elements 73 of the grand accumulator.

When it is desired to take an impression from the total type carriers the total key 247 (Fig. 6) is depressed and through its key pin 250 contacting with the arm 248, rock the shaft 249 to which the arm is secured. Arm 251 projecting forwardly from shaft 249 is connected by link 252 to an arm 253 (Fig. 9) which is secured to a shaft 254. Through this connection, when the shaft 249 is rocked upon the depressing of the total key, the shaft 254 will also be rocked. Upon the rocking of this latter shaft an arm 255 (Fig. 13) projecting forwardly from said shaft, will, through a pin and slot connection 256 and 257 respectively, rock a plate 258 in a clockwise direction, which movement will, through cam slot 260 formed in said plate engaging with the roller 216, rock the arm 215 and shaft 214 so that the roller 216 will pass into the cam groove 261 also formed in the disk 218 which is secured to the shaft 4. The cam groove 261 is formed so as to rock the arm 255 in an anti-clockwise direction which is opposite from that in which it is rocked when in engagement with the cam groove 217 of the disk 218. This rocking of the arm 255 by the cam groove 261 will rock the shaft 214 and lever 211 (Fig. 2) so as to carry the platen 212 against the total type carriers 213 to take an impression therefrom upon the record strip 210. This impression is taken near the end of the operation of the machine, and previous to the taking of this impression the record strip is arranged to be fed a greater length than it is ordinarily fed so as to bring the last listed item above where the total is to be recorded upon the record strip, this additional feed being necessary owing to the direction of feed of the record strip and also because of the fact that the item type carriers are in the rear of the total type carriers.

Upon the rocking of the shaft 254 by the depressing of a total key, the link 263 connected to the arm 253 (Fig. 9) will draw a roller 268 projecting from the forward end of an arm 266 into a cam groove 271 formed in a disk 272 which is secured to the shaft 4, so that as said shaft is rotated the groove 271 will rock the arm 266 farther in a countter clockwise direction, by which movement the shaft 267 and the arm 269 projecting rearwardly therefrom will also be moved in a counter clockwise direction. This movement will cause the camming projection 270 formed on the rear end of the arm 269 to engage with the bevel portion 273 of the pinion 274 (Fig. 8) and move said pinion to the right so that the ratchet teeth 276 formed on the side thereof will engage with ratchet teeth 277 projecting from the side of the ratchet 224 which is secured to the storage roll 223. When the connection between the ratchets 276 and 277 is established, pinion 274, which is continuously rotated by pinion 275 secured to the rotation shaft 8, will rotate the storage roll a sufficient distance to bring the last item recorded on the record strip 210 above the position where the total is to be recorded so that the total will appear at the foot of the listed items. Immediately after the total taking impression, which occurs near the end of the operation of the machine, the total key will be released in a manner similar to the amount keys and spring 262 (Figs. 6, 9 and 13), will restore the parts shown in said figures to their normal position, so that upon subsequent operations of the machine the cam groove 217 of the disk 218 will rock the shaft 214 and platen 209 carried thereby to take an impression from the item type carriers.

While the form of mechanism herein shown and described is admirably adapted to fulfil the objects primarily stated, it is to be understood that it is not intended to confine the invention to the one form of embodiment herein shown and described, but that it is susceptible of embodiment in various forms all coming within the scope of the claims which follow.

What is claimed is:

1. In an accounting machine, the combination with an accumulator, of differentially movable actuators therefor, means including a disk having a cam groove, for moving the accumulator into engagement with said actuators, and means for blocking the cam groove when it is desired to enter a transaction in the machine without accumulating it.

2. In an accounting machine, the combination with an accumulator, of differentially movable actuators therefor, a movable frame carrying said accumulator, means, including a disk having a cam groove, for rocking the frame thereby carrying the accumulator into engagement with the actuators, and a plate mounted adjacent to the disk for blocking the cam groove when it is desired to enter a transaction in the machine without accumulating it.

3. In an accounting machine, the combination with an accumulator, of differentially movable actuators therefor, a movable frame carrying said accumulator, a roller projecting from said frame, a disk having a cam groove in which the roller plays, the shape of the cam groove being such that upon a complete rotation of the disk the accumulator carried by the frame will be rocked into and out of engagement with the actuators, a plate mounted adjacent to the disk, and manipulative devices for moving said plate so as to prevent the roller from passing into the cam groove thereby holding the accumulator out of engagement with the actuators during the operation of the machine.

4. In an accounting machine, the combination with a main operating mechanism, of independent series of type carriers for recording items and the total thereof, a lever and a pair of platens carried thereby for taking impressions from the type carriers, means operated by the main operating mechanism for rocking the lever in opposite directions so as to take an impression from either set of type carriers and manipulative means for controlling said rocking means.

5. In an accounting machine, the combination with a main operating mechanism, of independent series of type carriers for recording items and the total thereof, a platen for each series of type carriers for taking an impression therefrom, a centrally pivoted lever for operating said platens, means operated by the operating mechanism for rocking the lever in either direction dependent upon the impression desired and manipulative means for controlling said rocking means.

6. In an accounting machine, the combination with independent series of type carriers for recording items and the total thereof, of a platen for each series of type carriers for taking an impression therefrom, a centrally pivoted lever for operating said platens, a pair of cams for rocking the lever in opposite directions so as to actuate the platens to obtain impressions from the type carriers, and means for determining which cam is to rock the lever.

7. In an accounting machine, the combination with independent series of type carriers for recording items and the total thereof, of a platen for each series of type carriers for taking an impression therefrom, a centrally pivoted lever carrying at each end one of said platens, a disk having two cam grooves for rocking the lever in opposite directions, the lever normally being in operative relation with the cam groove which rocks the lever in the direction for one of the platens to take an impression from the item type carriers, and a total key for bringing the lever under the control of the total impression cam.

8. In an accounting machine, the combination with independent series of type carriers for recording items and the total thereof, of a platen for each series of type carriers for taking an impression therefrom, a centrally pivoted lever carrying at each end one of said platens, a disk having two cam grooves for rocking the lever in opposite directions, and means for bringing the lever under the control of either cam groove dependent upon the impression desired.

9. In an accounting machine, the combination with type carriers for recording items and the total thereof upon a record strip, of an operating mechanism, devices actuated by the operating mechanism for feeding the strip when items are recorded, a total key, additional devices normally disconnected for feeding the record strip a greater distance when a total is recorded than when items are recorded, and means under the control of the total key for connecting the additional feeding devices with the operating mechanism.

10. In an accounting machine, the combination with independent series of type carriers for recording items and the total thereof upon a record strip, of an operating mechanism, devices actuated by the operating mechanism for feeding the strip when items are recorded, additional devices normally disconnected from the operating mechanism for feeding the record strip a greater distance when a total is recorded than when items are recorded, a total key, and means under the control of said key for connecting the total feeding devices with the operating mechanism.

11. In an accounting machine, the combination with type carriers for recording items and the total thereof upon a record strip, of means for feeding the record strip when items are recorded, a second means for feeding the record strip a greater distance when a total is recorded than when items are recorded, the second means being normally inoperative, an operating mechanism for actuating both of said feeding means, a clutch for connecting the total feeding means and operating mechanism, a total key, and means under the control of the total key for operating the clutch.

12. In an accounting machine, the combination with a movable frame and a plurality of accumulators carried thereby, of a set of actuators common to said accumulators, a motor spring for moving the accumulator frame, means normally preventing the operation of said spring, manipulative devices for operating the preventing means and controlling the extent of movement of said frame thereby determining the accumulator that is to be brought into operative relation with the actuators, and means for positively returning the frame to its normal position.

13. In an accounting machine, the combination with a movable frame and a plurality of accumulators carried thereby, of a set of actuators common to said accumulators, a motor spring for moving the accumulator frame, means normally preventing operation of said spring, manipulative devices for operating the preventing means and controlling the extent of movement of said frame, thereby determining the accumulator that is to be brought into operative relation with the actuators, means preventing rebound of the frame, and means for restoring the frame to its normal position.

14. In an accounting machine, the combination with a movable frame and a plurality of accumulators carried thereby, of a set of actuators common to said accumulators, a motor spring for moving the accumulator frame, means normally preventing operation of said spring, manipulative devices for operating the preventing means and controlling the extent of movement of said frame thereby determining the accumulator that is to be brought into operative relation with the actuators, a pawl and ratchet mechanism for preventing rebound of the frame, and an operating mechanism for disabling the said pawl and ratchet mechanism and for restoring the frame to its normal position.

15. In an accounting machine, the combination with a movable frame and a plurality of accumulators carried thereby, of a set of actuators common to said accumulators, a motor spring for moving the frame and bringing any one of the accumulators into position to be engaged by the actuators, means normally preventing operation of said spring, manipulative devices for operating the preventing means and controlling the extent of movement of said frame thereby determining the accumulator that is to be brought into position to be engaged by the actuators, and means for moving the actuators into engagement with the selected accumulator and then operating the latter by said actuators.

16. In an accounting machine, the combination with a frame and a plurality of accumulators carried thereby, of a set of actuators common to said accumulators, a motor spring for rotating the frame and bring any one of the accumulators into position to be engaged by the actuators, means normally preventing operation of said spring, manipulative devices for operating the preventing means and controlling the extent of movement of said frame thereby determining the accumulator that is to be brought into position to be engaged by the actuators, means for moving the actuators into engagement with the selected accumulator and then operating the latter by said actuators, and means for positively restoring the frame to its normal position.

17. In an accounting machine, the combination with an accumulator and actuating devices therefor, alining devices for said accumulator, and transfer devices for said accumulator, mounted on an element of said alining devices and movable thereby into and out of operative relation to said accumulator.

18. In an accounting machine, the combination with an accumulator, and actuating devices therefor, of means for engaging and disengaging said accumulator and its said actuating devices, alining devices movable to cause exact engagement of said accumulator and said actuating devices, and including a rod, and transfer devices for said accumulator, mounted on said rod, and moved thereby into and out of operative relation with said accumulator.

19. In an accounting machine, the combination with independent series of type carriers for recording items and the total thereof, of a lever and a pair of platens carried thereby for taking impressions from the type carriers, an operating mechanism for rocking the lever in opposite directions so as to take an impression from either set of type carriers, and means for determining whether an item or a total is to be recorded upon the operation of the operating mechanism.

20. In an accounting machine, the combination with independent series of type carriers for recording items and the total thereof, of a platen for each series of type carriers for taking an impression therefrom, a centrally pivoted lever for operating said platen, operating mechanism for rocking the lever in either direction dependent upon the impression desired, and means for determining the direction the lever is to be rocked by the operating mechanism.

21. In a machine of the class described, the combination with a movable frame and a plurality of accumulators carried thereby, of a set of actuators common to said accumulators, a series of keys, means for moving the accumulator frame from normal position under the control of the keys for the purpose of bringing any desired accumulator into coöperative relation with the actuators, means for preventing retrograde movement of the frame while it is moving under the control of the keys, and means for disabling the preventing means and restoring the frame to normal position.

22. In a machine of the class described, the combination with a movable frame and a plurality of accumulators carried thereby, of a set of actuators common to said accumulators, a series of keys, a motor spring for moving the accumulator frame from normal position under the control of the keys for the purpose of bringing any desired accumulator into coöperative relation with the actuators, means for preventing retrograde movement of the frame while it is moving under the control of the keys, and means for disabling the preventing means and restoring the frame to normal position.

23. In a machine of the class described, the combination with an accumulator, of a set of actuators therefor, means including a disk having a cam groove for establishing operative relation between the accumulator and actuators, and means for blocking the cam groove when it is desired to enter a transaction in the machine without accumulating it.

24. In a machine of the class described, the combination with an accumulator, of a set of actuators therefor, means including a disk having a cam groove for establishing operative relation between the accumulator and actuators, and a plate mounted adjacent to the disk for blocking the cam groove when it is desired to enter a transaction in the machine without accumulating it.

25. In a machine of the class described, the combination with a movable frame having an accumulator mounted therein, of a set of actuators for said accumulator, camming devices for moving the frame and thereby the accumulator into engagement with the actuators, resilient means for moving the frame into operative relation with the camming devices, and means for rendering ineffective the resilient means.

26. In a machine of the class described, the combination with a movable frame having an accumulator mounted therein, of a set of actuators for said accumulator, camming devices for moving the frame and thereby the accumulator into engagement with the actuators, and resilient means for moving the frame into operative relation with the camming devices.

27. In an accounting machine, the combination with an invariably moved driving member, of a driven member normally disconnected therefrom, a pawl operable to connect and disconnect the driving member and driven member, manipulative devices for controlling said pawl and thereby determining the extent of movement to be imparted to the driven member by the driving member, an indicator, connections between the driven member and the indicator; and means for positioning the indicator, through the connections, to display a character indicative of the extent of movement imparted to the driven member by the driving member and after the former has been adjusted by the latter member.

28. In an accounting machine, the combination with an invariably moved driving member, of a driven member normally disconnected therefrom, a pawl operable to connect and disconnect the driving member and the driven member, manipulative devices for controlling said pawl and thereby determining the extent of movement to be imparted to the driven member by the driving member, an indicator, devices connecting the driven member and the indicator, and means for moving said connecting devices to place the indicator to indicate the extent of movement imparted to the driven member.

29. In an accounting machine, the combination with an accumulator, of actuators therefor, a spring and a cam coöperating to effect engagement of the accumulator and its actuators, and manipulatively controlled means for preventing the coöperation of said spring and cam when items are entered which are not to be accumulated.

30. In an accounting machine, the combination with a recording device, of an accumulator, actuators for said accumulator, means comprising a spring and a cam normally coöperating to effect engagement of the accumulator and its actuators when items are entered in the recording device, and manipulatively controlled means for preventing the coöperation of said spring and cam when items are entered in the recording device which are not to be accumulated.

31. In an accounting machine, the combination with independent series of type carriers for recording items and the total thereof, of a platen for each series of type carriers for taking impressions therefrom, a centrally pivoted lever for operating said platens, driving mechanism, and means comprised by the driving mechanism for rocking the lever in either direction, depending upon whether it is desired to print an item or a total.

32. In an accounting machine, the combination with an operating mechanism, of independent series of type carriers for recording items and the totals thereof, a lever, a platen attached to each end of said lever, and means for operating the lever to cause one or the other of said platens to take an impression on every operation of the operating mechanism.

33. In an accounting machine, the combination with an operating mechanism, of independent series of type carriers for recording items and the totals thereof, a lever, a platen attached to each end of said lever, means for operating the lever to cause one or the other of said platens to take an impression on every operation of the operating mechanism, and manipulative means for controlling the operation of said lever.

34. In an accounting machine, the combination with independent series of type carriers for recording items and the totals thereof, of a centrally pivoted lever, a platen pivoted to each end of said lever, means for rocking the lever in opposite directions to take an impression from either set of type carriers, and means for guiding said platens to bring their impression surfaces parallel to the faces of the type when taking an impression.

35. In a machine of the class described, the combination with a main operating mechanism, of a differentially movable member, a spring for actuating said member, keys for determining the movement of the member, a device constructed to permit movement of the member by its spring but prevent rebound thereof, and means operated by the main operating mechanism for disabling said device.

36. In a machine of the class described, the combination with a main operating mechanism, of a differentially movable member, a spring for actuating said member, keys for determining the movement of the member, a notched plate, a pawl constructed to coöperate with said notched plate to permit movement of said member by its spring but to prevent rebound of said member, and means operated by the main operating mechanism for disabling said pawl.

In testimony whereof I affix my signature in the presence of two witnesses.

FRANCESCO SKERL.

Witnesses:
W. M. McCARTHY,
CARL W. BRUST.